Oct. 16, 1962 H. HECHT 3,058,700
FLIGHT CONTROL EQUIPMENT
Filed May 22, 1961
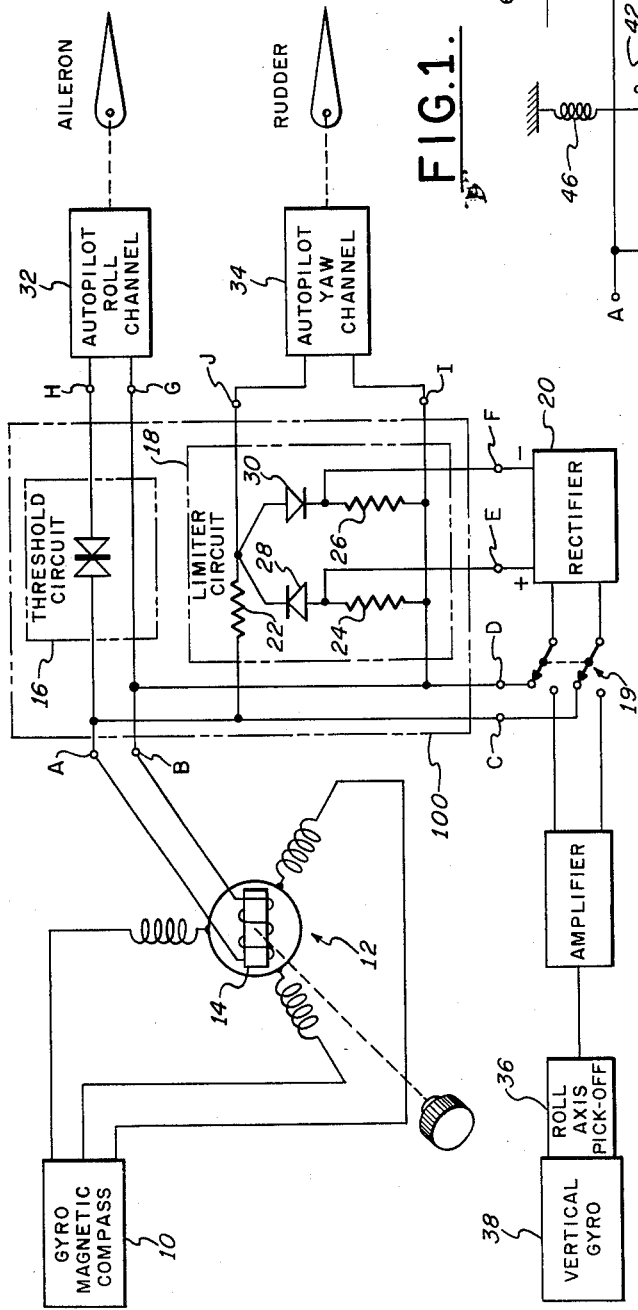
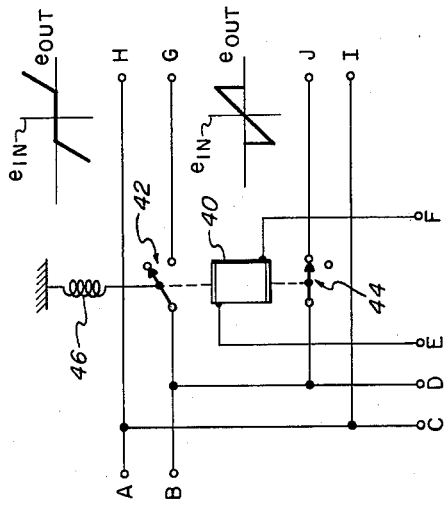
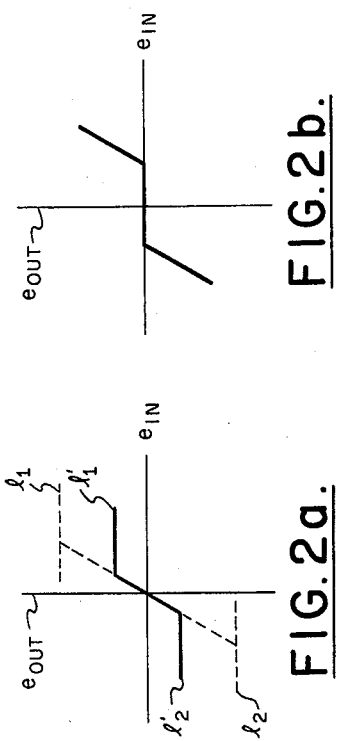
INVENTOR.
HERBERT HECHT
BY
ATTORNEY

United States Patent Office 3,058,700
Patented Oct. 16, 1962

3,058,700
FLIGHT CONTROL EQUIPMENT
Herbert Hecht, Scottsdale, Ariz., assignor to Sperry Rand Corporation, Great Neck, N.Y., a corporation of Delaware
Filed May 22, 1961, Ser. No. 111,582
8 Claims. (Cl. 244—77)

This invention relates generally to flight control systems and more particularly to apparatus for improving the ability of such systems to make aircraft assume selected headings.

A heading selector, generally, compares a signal representing the instantaneous heading of an aircraft with a signal representing a desired heading to produce a heading error signal. As is presently practiced, this signal is applied exclusively to the roll channel of a flight control system, whereby the system causes the craft to bank and turn toward the desired heading. Changing to selected headings exclusively by means of the roll channel has pronounced limitations. For example, in the event there is only a slight difference between the selected heading and the actual heading of the craft, a small heading error signal will be produced by the heading selector which will cause the craft to bank slightly, thereby causing the craft to assume the selected heading at an extremely slow rate. Further, the craft will tend to overshoot the selected heading because of the low response of the roll channel to correct for heading errors.

The present invention enables a flight control system to control an aircraft so that it assumes a selected heading more quickly and with greater accuracy. Generally, apparatus embodying the present invention applies the heading error signal from the heading selector simultaneously to a limiting device and a threshold, or dead zone, device. These two devices cooperate so that the limiting device alone or the threshold device alone has an output signal depending on whether the heading error signal is respectively below or above a certain level. The output signal from the limiting device is applied to the yaw channel of a flight control system and the output signal from the threshold device is applied to the roll channel of the flight control system. With no heading error, the selection of a new, but slightly different, heading causes a small heading error signal to be applied to and pass through the limiting device to the flight control system yaw channel (no signal being applied to the roll channel). As a result, the craft instantly skids around to the exact heading desired. If, on the other hand, a substantially different "new" heading is selected, a large signal is applied to the roll channel, thereby causing the craft to change heading in the manner of the prior art.

As will be explained later, apparatus embodying the present invention provides the following additional advantages:

(a) When the heading is adjusted, the craft starts to turn instantly toward the selected heading, regardless of the amount that the heading selector is adjusted, (b) The signal applied to the flight control system yaw channel is damped in proportion to the magnitude of that signal, thereby preventing excessive loading on the rudder of the craft, (c) The craft will tend to assume the selected heading at substantially the same rate that the heading selector is adjusted.

In the ordinary prior art operation of an aircraft, the pilot makes small yaw corrections by means of the craft rudder pedals and large corrections through the use of the craft ailerons, i.e. by moving the craft control stick. In this way, passenger discomfort resulting either from frequent banking or side accelerations of the craft is minimized. By means of the present invention, a single device (the heading selector) may be operated to perform a function that, in the prior art, required the operation of both the rudder pedals and the craft control stick.

A principal object of the invention is to provide apparatus for increasing the ability and responsiveness of a flight control system to make an aircraft assume a selected heading.

Another object of the invention is to provide heading selecting equipment which utilizes the responsiveness of an aircraft to rudder deflections to correct for small heading errors.

The invention will be described with reference to the figures wherein:

FIG. 1 is a schematic diagram of one form of the invention,

FIG. 2a is a diagram of the relationship between the heading error input signal and the limiter circuit output signal, FIG. 2b is a diagram of the relationship between the heading error input signal and the threshold circuit output signal, and FIG. 3 is a schematic diagram of a circuit which may be substituted for a portion of FIG. 1.

Referring to FIG. 1, a gyromagnetic compass 10 applies a signal representing the instantaneous heading of an aircraft to a heading selector 12. The heading selector 12, resembling electrically a synchro, is provided with a positionable rotor 14, the coil of which provides no output signal so long as the craft is on the selected heading. Rotation of the rotor to select a new heading instantly produces a signal representing the difference between the actual heading of the craft and the new selected heading. The output signal from the rotor 14 is applied simultaneously to a threshold circuit 16, to a limiter circuit 18 and, via a switch 19, to a rectifier 20. The threshold circuit 16 is shown consisting of a double zener diode but may, if preferred, be similar to the circuit shown in Electronic Analog Computers, Korn and Korn, McGraw-Hill Book Company, page 292, FIG. 6.23c. The limiter circuit 18, consisting of resistors 22, 24 and 26 and diodes 28 and 30, is essentially the same as the circuit shown in the above-named publication on page 292, FIG. 6.23d. The rectifier 20 applies bias voltages (which vary in direct proportion to the magnitude of the heading error) to the diodes 28 and 30 and cause those diodes to be biased forwardly. The output signals from the threshold and limiter circuits 16 and 18 are applied respectively to the roll channel 32 and the yaw channel 34 of an autopilot.

A switch 19 may be operated to apply a bank angle signal, instead of the heading error signal, to the rectifier 20, thereby providing (as will be described later) another form of the invention. The bank angle signal is provided by a roll axis pick-off 36 on a vertical gyro 38.

Because the bias voltages applied to the limiter circuit 18 are derived from a variable heading error signal, they too are variable: When the heading error signal is small, the bias voltages applied to the limiter circuit are small; when the heading error signal is large, the bias voltages are large. This causes the limiter circuit 18 to react differently to heading error signals of different magnitudes. For small heading error signals, the limiter circuit 18 has, as shown in FIG. 2a, limiting levels $l_1$ and $l_2$; however, as the bias voltages increase, the limiting levels decrease to, for example, $l_1'$ and $l_2'$. With the heading error signal exceeding a particular amount, the limiting levels become so close together that the limiter circuit 18 is essentially disabled and no signal can be applied therethrough to the yaw channel 34. However, the threshold circuit 16 is so designed (see FIG. 2b) that, once the heading error signal exceeds this particular amount, it is applied through the threshold circuit 16 to the roll channel 32.

When the heading selector 12 is adjusted so that a very small heading error signal is induced in the coil of the rotor 14, the limiter circuit 18 (having, for example, limiting levels $l_1$ and $l_2$) alone has an output signal which is applied to the autopilot yaw channel 34. The autopilot yaw channel 34 then moves the craft rudder which instantly causes the craft to skid (a small amount) around to the exact heading selected. When the heading selector 12 is adjusted so that a large error signal is induced in the coil of the rotor 14, the limiting levels gradually float down and cause the limiter circuit 18 to become disabled. The reason for the "gradual floating down etc." is that, whereas the limiter circuit 18 instantly sees the heading error signal, it sees the bias voltages from the rectifier 20 only after a finite time delay, this delay being caused by the filtering action of the rectifier 20. As a result, the craft instantly starts to skid around to the selected heading and, while so doing, the autopilot roll channel 32 becomes effective and corrects for the heading error in the manner of the prior art.

Since the limiting levels of the limiter circuit 18 "float down" in proportion to the magnitude of the heading error signal, the output signal from the limiter circuit 18 is damped in proportion to the magnitude of its applied signal. That is, the forward gain of the limiter circuit 18 is decreased gradually as the magnitude of the applied heading error signal is increased. As a result, the autopilot yaw channel 34 is prevented from moving the craft rudder rapidly to its extreme limits of deflection, thereby preventing excessive loading on the craft rudder.

When the rotor 14 of the heading selector 12 is rotated very slowly, the threshold circuit 16 never has an output signal because the autopilot yaw channel 34 follows-up constantly to correct for heading errors. Therefore, while the yaw channel responds always to provide small "short term" heading changes, it responds also to "long term" heading error signals produced by the heading selector 12, regardless of the magnitudes of those signals. Rapid rotation of the rotor 14, on the other hand, is followed rapidly by either the autopilot yaw channel alone or the yaw and roll channels together (as described above) depending on whether the heading error signal is respectively small or large.

If preferred, an amplified output signal from the vertical gyro roll axis pick-off 36 may, at the instant the craft starts to roll in response to an output signal from the threshold circuit 16, be applied to the rectifier 20 (instead of continuously applying the heading error signal thereto). However, even with this form of invention, small and large errors between actual and selected headings will be cancelled respectively by means of the autopilot yaw and roll channels 34 and 32.

The apparatus of FIG. 3 may, if preferred, be connected to points A through J of FIG. 1 in place of the circuit contained within the dashed lines 100 to produce another embodiment of the invention, this embodiment operating in a manner similar to the last-described form of the invention. The apparatus of FIG. 3 consists of a relay 40 and a pair of switches 42 and 44 operable therewith. The relay 40, when energized by a particular output voltage from the rectifier 20, closes the switch 42 and opens the switch 44 against the tension of a spring 46; when the rectifier 20 output voltage falls below the above-mentioned particular level, the switch 42 opens and the switch 44 closes. With the switch 42 open, the heading error signal is applied through the switch 44 to the autopilot yaw channel 34; with the switch 44 open, the heading error signal is applied through the switch 42 to the autopilot roll channel 32. Characteristic curves for the relay 40—switch 44 circuit and the relay 40—switch 42 circuit are shown in FIG. 3 near their respective switches.

While the invention has been described in its preferred embodiments, it is to be understood that the words which have been used are words of description rather than of limitation and that changes within the purview of the appended claims may be made without departing from the true scope and spirit of the invention in its broader aspects.

What is claimed is:

1. Apparatus for use with a flight control system comprising heading selecting means for producing a signal representing the difference between a selected heading and the actual heading of an aircraft, first and second means receiving said signal, said first means alone having an output signal when its applied signal has a magnitude below a predetermined level and said second means alone having an output signal when its applied signal exceeds said predetermined level, said first and second means being adapted to apply their output signals respectively to the yaw and roll channels of said flight control system.

2. Apparatus for use with an aircraft flight control system comprising a heading selector adapted to receive a signal representing the actual heading of said aircraft and a signal representing a selected heading to produce a signal representing the difference between these two headings, first means responsive when said heading difference signal has a magnitude below a certain level to apply a signal to the yaw channel of said flight control system, and second means responsive when said heading difference signal has a magnitude above a certain level to apply a signal to the roll channel of said flight control system.

3. Apparatus for use with a flight control system comprising heading selecting means for producing a signal representing the difference between a selected heading and the actual heading of an aircraft, limiter means and threshold means both receiving said signal, means operable with said limiter means reducing the limiting levels of said limiter means at substantially the same time that said threshold means has an output signal, said limiter means and said threshold means being adapted to apply output signals respectively to the yaw and roll channels of said flight control system.

4. Heading selecting apparatus usable with an aircraft flight control system comprising a heading selector producing a signal representing the difference between a selected heading and the actual heading of said aircraft, limiting means, means operable with said limiting means for varying the limiting levels of said limiting means, threshold means responsive to produce an output signal when said means operable with said limiting means causes said limiting means to have substantially no output signal, said limiting means and said threshold means being each adapted to receive the heading selector output signal and to apply their output signals respectively to the yaw and roll channels of said flight control system.

5. Heading selecting apparatus usable with an aircraft flight control system comprising a heading selector producing a signal representing the difference between a selected heading and the actual heading of said aircraft, limiting means, means operable with said limiting means for varying the limiting levels of said limiting means inversely with the magnitude of the output signal from said heading selector so that large and small heading selector output signals respectively decrease and increase said limiting levels, threshold means responsive to produce an output signal when said means operable with said limiting means causes said limiting means to have substantially no output signal, said limiting means and said threshold means being each adapted to receive the heading selector output signal and to apply their output signals respectively to the yaw and roll channels of said flight control system.

6. Heading selecting apparatus usable with an aircraft flight control system comprising a heading selector producing a signal representing the difference between a selected heading and the actual heading of said aircraft, limiting means, threshold means, means operable with said limiting means for reducing abruptly the limiting levels of said limiting means to extremely low levels at the instant said threshold means has an output signal, threshold means responsive to produce an output signal when said means operable with said limiting means causes said limiting means to have substantially no output signal, said limiting means and said threshold means being each adapted to receive the heading selector output signal and to apply their output signals respectively to the yaw and roll channels of said flight control system.

7. Heading selecting apparatus usable with an aircraft flight control system comprising a heading selector producing a signal representing the difference between a selected heading and the actual heading of said aircraft, limiting means, threshold means, means operable with said limiting means for reducing abruptly the limiting levels of said limiting means to extremely low levels at the instant said aircraft banks more than a predetermined amount, threshold means responsive to produce an output signal when said means operable with said limiting means causes said limiting means to have substantially no output signal, said limiting means and said threshold means being each adapted to receive the heading selector output signal and to apply their output signals respectively to the yaw and roll channels of said flight control system.

8. Apparatus for use with an aircraft flight control system comprising a heading selector adapted to receive a signal representing the actual heading of said aircraft and a signal representing a selected heading to produce a signal representing the difference between these two headings, bias means, limiting means adapted to have its limiting levels vary in accordance with the output signal from said bias means, threshold means, said limiting means and said threshold means being each adapted to receive said heading difference signal, said threshold means producing an output signal only when the limiting levels of said limiting means are so low that said limiting means effectively passes no signal, said threshold means and said limiting means being adapted to apply their output signals to the roll and yaw channels respectively of said flight control system.

References Cited in the file of this patent
FOREIGN PATENTS
755,726     Great Britain _____ Aug. 29, 1956